United States Patent
Huffman

[11] 3,713,292
[45] Jan. 30, 1973

[54] HYDRAULIC BRAKE SYSTEM
[75] Inventor: Herman M. Huffman, Owosso, Mich.
[73] Assignee: Midland-Ross Corp., Cleveland, Ohio
[22] Filed: Jan. 20, 1971
[21] Appl. No.: 108,165

Related U.S. Application Data
[62] Division of Ser. No. 800,589, Feb. 19, 1969, Pat. No. 3,635,025.

[52] U.S. Cl. ............60/54.5 P, 60/54.6 M, 60/52 B, 188/359
[51] Int. Cl. ..........................F15b 7/00, F15b 15/18
[58] Field of Search...........60/54.5 P, 54.6 P, 54.5 E, 60/54.6 E, 54.6 M, 52 B; 188/359

[56] References Cited

UNITED STATES PATENTS

| | | | |
|---|---|---|---|
| 3,283,505 | 11/1966 | Julow et al. | 60/54.5 P |
| 2,195,558 | 4/1940 | Bowen | 60/54.6 M |
| 3,267,663 | 4/1966 | Schultz | 60/52 B |
| 3,250,575 | 5/1966 | Shilton | 188/359 |
| 3,208,802 | 9/1965 | Thirion | 188/359 |
| 3,321,917 | 5/1967 | Tenniswood | 60/54.6 P |

FOREIGN PATENTS OR APPLICATIONS

| | | | |
|---|---|---|---|
| 765,079 | 1/1957 | Great Britain | 60/54.6 P |
| 767,438 | 8/1952 | Germany | 60/54.6 M |

*Primary Examiner*—Martin P. Schwadron
*Assistant Examiner*—A. M. Zupcic
*Attorney*—Malcolm R. McKinnon

[57] ABSTRACT

A dual power and manual hydraulic brake system for a motor vehicle including a fluid pressure operated mechanism for actuating wheel brake shoes or the like, a master cylinder containing a power or primary fluid pressure generating portion and a manual or secondary fluid pressure generating portion, and separate hydraulic circuits associated with the primary and secondary portions so as to provide separate power and manual brake systems. In the event of failure of one of the systems, the other system can operate independently thereof. Brake pedal means are provided for concurrently actuating the primary and secondary portions of the master cylinder.

4 Claims, 6 Drawing Figures

INVENTOR
HERMAN M. HUFFMAN

FIG. 2

INVENTOR
HERMAN M. HUFFMAN

FIG_4

FIG_5

INVENTOR
HERMAN M. HUFFMAN

FIG_6

INVENTOR
HERMAN M. HUFFMAN

ATTORNEYS

HYDRAULIC BRAKE SYSTEM

CROSS REFERENCE TO RELATED APPLICATIONS

This application is a division of the applicant's copending application Ser. No. 800,589 filed Feb. 19, 1969 now U.S. Pat. No. 3,635,025.

BACKGROUND OF THE INVENTION

The present invention relates to hydraulic brake systems, and more particularly to a dual power and manual system wherein the manual system will be operative in the event of failure of the power brake system.

In conventional dual brake systems of this character, one of the problems that often arises is that in the event of loss of fluid or pressure in the power brake system, the brake pedal used to operate the master cylinder drops from its normal operating position, thereby creating difficult and sometimes unsafe driving conditions for using the pedal with a secondary manual brake system. Also, in some instances, it is difficult for the operator of the vehicle to recognize, merely by feel of the brake pedal, if one or the other of the systems is out of order or not functioning properly.

SUMMARY OF THE INVENTION

The present invention overcomes these and other shortcomings of the prior art, and according to the preferred embodiments of the present invention, a hydraulic brake system is provided comprising a fluid pressure operated mechanism, operable from either of two separate hydraulic pressure sources to actuate a wheel brake element, a power cylinder means, a manual cylinder means, said power and manual cylinder means being operable in separate hydraulic circuits in communication with the mechanism for independently applying hydraulic pressure to such mechanism, push rod means operatively associated with each of said cylinder means for actuating the same, a linkage pivotally connected to the push rod means, and a brake pedal connected to said linkage for exerting pressure on the push rod means to actuate both cylinder means. The system includes means responsive to pressure in the circuit associated with the power cylinder means to exert a pressure in the circuit associated with the manual cylinder means so that when pressure is applied to the brake pedal, movement of the push rod means is opposed. In one form of the invention, the linkage is adapted to pivot on the push rod means of the manual cylinder means which will provide a substantially fixed pivot because of the pressure exerted on the manual cylinder means, thereby enabling the power brake system to function substantially as if no secondary manual brake system were present. In the event of failure of the power system, the power cylinder means is constructed so that the power piston therein will be seated, thereby providing a fixed support for the associated push rod, and the manual brake system will then be operative to actuate the fluid pressure operated mechanism of the wheel brake, and the linkage means will function under these conditions by pivoting on the push rod of the power cylinder means so that the brake pedal will continue to assume substantially its normal position irrespective of whether the power system or the manual system is being operated. In another embodiment of the invention, a single push rod is utilized to accomplish the foregoing purposes.

In the preferred forms of the invention, the master cylinder assembly comprises primary and secondary fluid pressure generating portions, the primary portion including a bore defining a first passageway providing communication between a reservoir and a hydraulic pump for supplying hydraulic fluid under pressure when the brake pedal is applied, and a second passageway providing communication between the pump and the fluid pressure operated mechanism of the wheel brake. A piston assembly is movable in the bore between a normally retracted position in which unrestricted flow of fluid can occur through the first passageway and an advanced position in which fluid under pressure from the source is diverted through the second passageway. The bore contains a seat for the piston assembly when the latter is in its advanced position, on which the piston assembly can be seated in the event of loss of fluid pressure in the power system. The secondary portion of the master cylinder assembly includes a bore and a piston assembly therein movable in a fluid pressure generating direction, the last-named bore defining with the advance end of its associated piston assembly a pressure generating chamber provided with an outlet passageway for communicating with the mechanism, this last-named bore containing a seat for its associated piston assembly when the latter is in its most advanced position for supporting the piston assembly in a fixed position in the event a fluid pressure loss occurs in the manual or secondary braking system.

It is an object of the present invention to provide an improved hydraulic braking system having a primary power circuit and a secondary manual circuit for operating the wheel brake. It is a further object of the present invention to provide a brake system of this character which is constructed and arranged so that the operator can easily distinguish between manual and power operation of the brake system; wherein the brake pedal remains in its normal operating position irrespective of failure of operation of the power system; and wherein the power system is operable to exert a pressure on the manual brake system circuit whereby this pressure can be used to stabilize the position of the brake pedal during normal operation of the system.

Other objects of this invention will appear in the following description and appended claims, reference being had to the accompanying drawing forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DESCRIPTION OF THE FIRST EMBODIMENT

Figure 1:
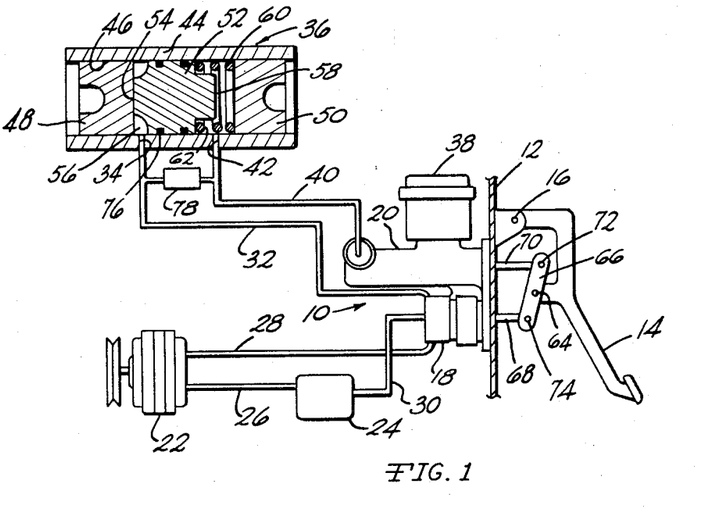
FIG. 1 is a schematic drawing of a dual power and manual brake system illustrating one embodiment of the present invention.
Figure 2:
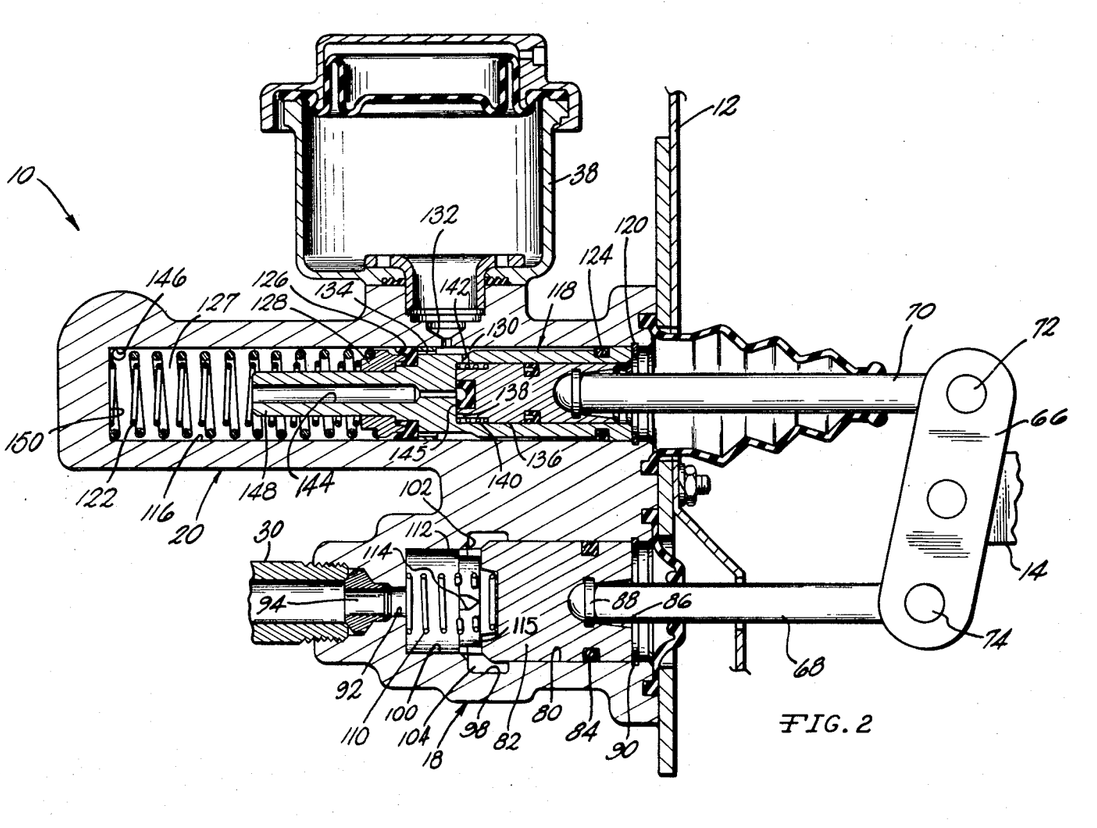
FIG. 2 is an enlarged fragmentary sectional view taken longitudinally through the master cylinder assembly of the brake system illustrated in FIG. 1.
Figure 3:
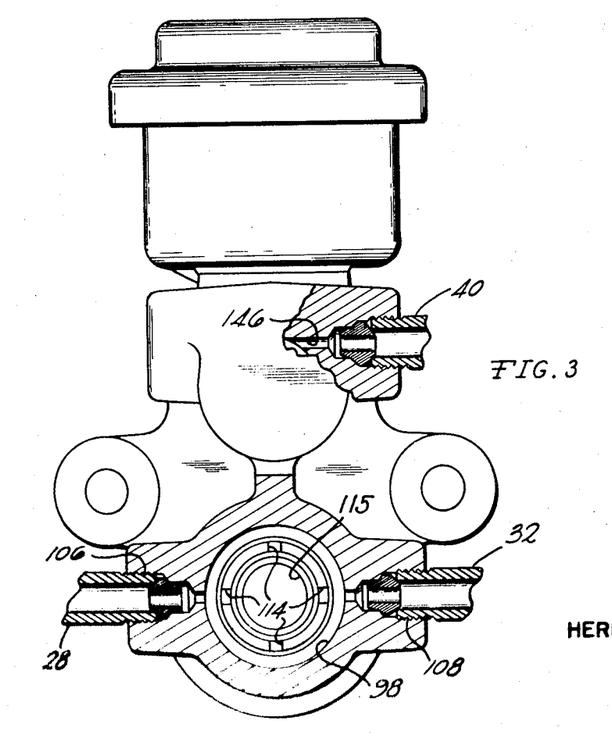
FIG. 3 is an end elevation, partly in section, of the master cylinder assembly illustrated in FIG. 1.

Referring first to FIG. 1, a brief description of the hydraulic system will be provided, after which a more detailed description of the master cylinder will be presented, with particular reference to FIGS. 2 and 3. In this embodiment of the invention, the dual power and manual brake system includes a master cylinder assembly, generally designated 10, which may be mounted on the firewall 12 of a motor vehicle so as to be in a position to be actuated by the brake pedal 14, which is pivotally mounted at 16 to the firewall 12. The master cylinder 10 has a power or primary fluid pressure generating portion 18 and a manual or secondary fluid pressure generating portion 20.

The power brake system includes a suitable source of hydraulic fluid, such as the gear pump 22, arranged to receive hydraulic fluid from the reservoir 24 via the conduit 26 and to discharge the fluid under pressure to the power portion 18 via the conduit 28. When the pump 22 is operating and the power portion 18 is in its inoperative position shown in FIG. 2, the fluid flowing through the conduit 28 will pass through the power portion 18 and will return to reservoir 24 via conduit 30. When the brake pedal 14 is depressed to actuate the power portion 18, the fluid will be pressurized and diverted in the power portion 18 to the conduit 32, which is in communication, by way of port 34, with the wheel cylinder or fluid pressure operated mechanism 36. The latter is located in a suitable position for actuating elements of a wheel brake, such as brake shoes or the like, not shown.

The manual brake system includes the hydraulic fluid reservoir 38 which is arranged to provide fluid to the pressure generating chamber, to be described, within the secondary fluid generating portion 20, from which the fluid is in communication with the wheel cylinder or fluid pressure operated mechanism 36, via the conduit 40 and the port 42.

The wheel cylinder or fluid pressure operated mechanism 36 comprises a housing 44 having a bore 46 therein containing the laterally expansible first and second pistons 48 and 50. These pistons are adapted to be coupled in a conventional manner to brake elements, such as brake shoes, not shown, for applying the brakes of a vehicle. Positioned between the pistons 48 and 50 is a floating or sliding piston 52 which has one end portion 54 normally seated against the first piston 48. An annular pressure chamber 56 surrounds the seated portion 54 and is in communication with the port 34. The floating piston 52 is provided at its opposite end with an end portion 58 which normally is spaced from the piston 52 by means of a compression spring 60. Thus, a second chamber 62 is provided which is in communication with the port 42. By virtue of this arrangement, when pressurized fluid is introduced into the chamber 56 from the power portion 18, the pressure created in the chamber 56 will urge the piston 48 to the left, and the sliding piston 52 to the right, as viewed in FIG. 1. The latter will then compress the spring 60 and pressurize the chamber 62 so as to urge the piston 50 to the right, and thereby, the pistons 48 and 50 will act to operate the brake elements, not shown. The movement of the sliding or floating piston 52 will also have the effect of reducing the volume of the chamber 62, thereby creating a pressure in the conduit 40 to the secondary or manual fluid pressure generating portion 20, such pressure corresponding in magnitude substantially to that of the pressure in the conduit 32. This pressure will have the effect of holding the manually actuated fluid pressure generating portion 20 in a fixed position, for a purpose to be described.

As previously indicated, the master cylinder assembly 10 is operated by depressing the pedal 14 about the fixed pivot 16. When this is done, the pedal, which has a pivot 64 thereon transmits the movement to the linkage 66 which is pivotally connected to the pivot 64, and the linkage 66 is in turn pivotally connected to the push rods 68 and 70 which are parts of the power portions 18 and 20, respectively, of the master cylinder 10. As this occurs, the pressure from the conduit 40 will act upon the manual portion 20, in a manner to be described, holding the push rod 70 in substantially a fixed position so that the pivot 72 which connects the linkage 66 and the push rod 70 together will serve as the pivot about which the linkage 66 turns. Thus, in the normal operation of the master cylinder 10, actuation of the brake pedal 14 will have the effect of operating the power portion 18 which in turn will lock the push rod 70 in a fixed position so that the movement of the brake pedal 14 will be transmitted essentially only to the push rod 68.

However, if a loss of pressure should occur in the power system, the push rod 68 will assume a seated position with respect to the power portion 18, and thereafter, the linkage 66 will pivot about the pivot 74 which connects the linkage 66 to the push rod 68, and under these circumstances, movement of the brake pedal 14 will have the effect of advancing the push rod 70 in a pressure generating direction in the manual portion 20 to introduce pressurized fluid into the chamber 62 via the conduit 40. Thus, if there is a loss of pressure in the conduit 32, the floating or sliding piston 52 will remain seated on the piston 48 of the fluid pressure operated mechanism 46, and the pressure generated in the chamber 62 from the manual portion 20 of the master cylinder 10 will act to urge the sliding piston 52 to the left against the piston 48 and simultaneously to urge the piston 50 to the right, whereby the fluid pressure operated mechanism 36 will function in its normal manner to actuate the vehicle brakes. In order to avoid loss of pressure from one of the chambers 56 and 62 to the other chamber, conventional annular seals 76 are provided around the periphery of the piston 52.

By virtue of the arrangement described, it will be recognized that a failure in the manual system will not impair the operation of the power system of the dual brake system. Thus, if there should be a loss of pressure in the manual system, when the power system is actuated, pressure will be transmitted to the chamber 56 moving the sliding piston 52 to the right until its end portion 58 abuts against the piston 50. Thereafter, the pistons 48 and 50 will be displaced laterally by virtue of the pressure in the chamber 56 so that the power system will operate in the normal fashion to actuate the brake elements. In the event of such failure of the manual system, the push rod 70 will assume a seated position in the manual portion 20, in a manner to be described, so that the pivot 72 will again serve as the pivot point for the linkage 66 during operation of the brake pedal 14.

As indicated, when both the power and the manual systems are operating properly, the pressure in the lines 32 and 40 will be substantially the same. Therefore, an alarm system can readily be provided to alert the operator of the vehicle to the failure of either of the dual systems by indicating when a pressure differential exists between the conduits 32 and 40. For this purpose a conventional pressure gauge 78 can be positioned between the conduits 32 and 40 for actuating any conventional form of alarm or light signal to indicate an abnormal pressure differential between the lines or conduits.

Referring now to FIGS. 2 and 3, a more detailed description of the master cylinder 10 will be provided. As thereshown, the power portion 18 has a bore 80 in which is slidably positioned a power piston 82. The latter is axially slidable in the bore and is provided with a suitable seal ring 84 to prevent loss of pressurized fluid out of the end of the bore 80. The piston 82 has a recess 86 therein adapted to receive the push rod 68, and the latter is locked in place by means of a snap ring 88. A snap ring 90 is seated in the outer end of the bore 80 to limit the outward movement of the piston 82. The other end of the bore 80 is provided with an outlet port 92 which contains a conventional tube seat insert 94, and the port 92 is in direct communication with the conduit 30, leading to reservoir 24.

As shown in FIG. 2, the bore 80 is provided with an enlarged annular groove 98 and a portion of reduced diameter at 100 so as to provide an annular seat at 102 on which the power piston 82 can seat, thereby restricting movement of the piston 82 to a relatively short stroke. When the piston is advanced from its normally inoperative position toward the seat 102, such movement will progressively close off communication between the annular chamber 104 and the outlet port 92, the annular chamber 104 also being in direct communication with the inlet port 106 and the conduit 28, and with the outlet port 108 and conduit 32.

Also contained within the bore 80 is a compression spring 110 which is positioned to urge the power piston 82 to its normally inoperative position. The forward or left end portion 112 of the power piston 82, as viewed in FIG. 2, is of a generally cup-shaped configuration having four circumferentially spaced generally V shaped slots 114 around its lip in communication with a cup-shaped recess 115 in the power piston 82 effective to control the volume of hydraulic fluid that is permitted to flow from the annular chamber 104 through the recess 115 to the port 92. It will be recognized that as the piston 82 advances into the bore 80, the effective area of the slots 114 for flow of the fluid therethrough will progressively diminish, thereby progressively increasing the pressure within the annular chamber 104 and the pressure to the conduit 28 via the port 106.

From the above description relative to the power portion 18 of the master cylinder 10, it will be understood that when the power piston is in its inoperative position shown in FIG. 2, fluid will normally flow continuously from conduit 28 through port 106 into the annular chamber 104 and then will flow through the slots 114, recess 115 and port 92 and out through conduit 30 for return to the reservoir 24. However, when the operator of the vehicle applies force to the brake pedal 14, thereby causing the push rod 68 to advance the power piston 82 toward its seating position, the flow to the outlet port 92 will be progressively restricted thereby increasing the pressure and causing actuation of the fluid pressure operated mechanism 36 by virtue of the increased pressure in the conduit 32. Thus, it can be seen that the power portion 18 has a first passageway providing communication between the port 106 and the port 92, and a second passageway providing communication between the port 106 and the port 108. It can also be seen that the length of the stroke of the piston 82 is relatively short, so that if a loss of fluid should occur in the power system, application of the brake pedal 14 will result in the power piston seating on the seat 102, and thereafter the manual portion can readily be actuated by pivoting of the linkage 66 around the then fixed pivot 74.

The manual portion 20 of the master cylinder 10 includes the bore 116 and a manual piston assembly 118 which is normally positioned in the right end of the bore 116 in abutment with the snap ring 120 and is adapted to receive a force through the push rod 70 for movement to the left in a pressure generating direction. The piston assembly 118 is urged to the right to its inoperative position by the pair of compression springs 122. A conventional seal 124 is provided at the outer end of the piston assembly 118 for providing a seal between the piston assembly and the bore 116. A conventional lip type seal 126 is also provided for effecting a fluid tight seal between the piston assembly and the bore 116 during advancement of the piston assembly in its pressure generating stroke for generating fluid pressure in the high pressure chamber 127. The lip type seal 126 is held in place by the retainer 128 on which the springs 122 are seated.

A low pressure chamber 130 is provided between the piston assembly 118 and the bore 116 which is in communication with the reservoir 38 by means of the port 132. During the return stroke of the piston assembly 118, the seal 126 can partially collapse to permit the high pressure chamber 127 to be replenished with fluid from the low pressure chamber 120.

The piston assembly 118 also includes a piston valve 136 normally spaced from the face 138 by means of the compression spring 140. The piston valve 136 also functions to replenish the high pressure chamber 127 by providing communication via port 142 and the duct 144 to replenish the high pressure chamber during the return stroke of the piston assembly 118. This communication is interrupted whenever pressure is applied from the push rod 70 to the valve 136, because the piston seal 145 will then seat on the face 138.

During the normal operation of the master cylinder 10, when the brake 14 is applied, pressure from the conduit 40 will be introduced through the port 146, which is in direct communication with the conduit 40, into the high pressure chamber 127. Thus, under these conditions, the linkage 66 can turn about the pivot 72 as previously described. However, in the event of a power failure in the power system, so that the power piston 82 seats on its seating surface 102, pressure will not be introduced into the pressure chamber 127 through the port 146 and the piston assembly 118 can then be advanced in a conventional manner into the pressure chamber 127 to generate fluid under pressure for actuating the brake system.

In the event of a loss of fluid pressure in the manual brake system, such failure will not impair the operation of the power system. In the event of such a failure, the relatively long projection 148 of the piston assembly 118 will seat on the closed end 150 of the manual portion 20, thereby maintaining the pivot 72 in a fixed position so that actuation of the power brake system in the normal manner can occur. Thus, in this embodiment of the invention a dual power and manual brake system is illustrated whereby each system is independently operable of the other and failure of one system will not impair the operation of the other system.

Figure 4:
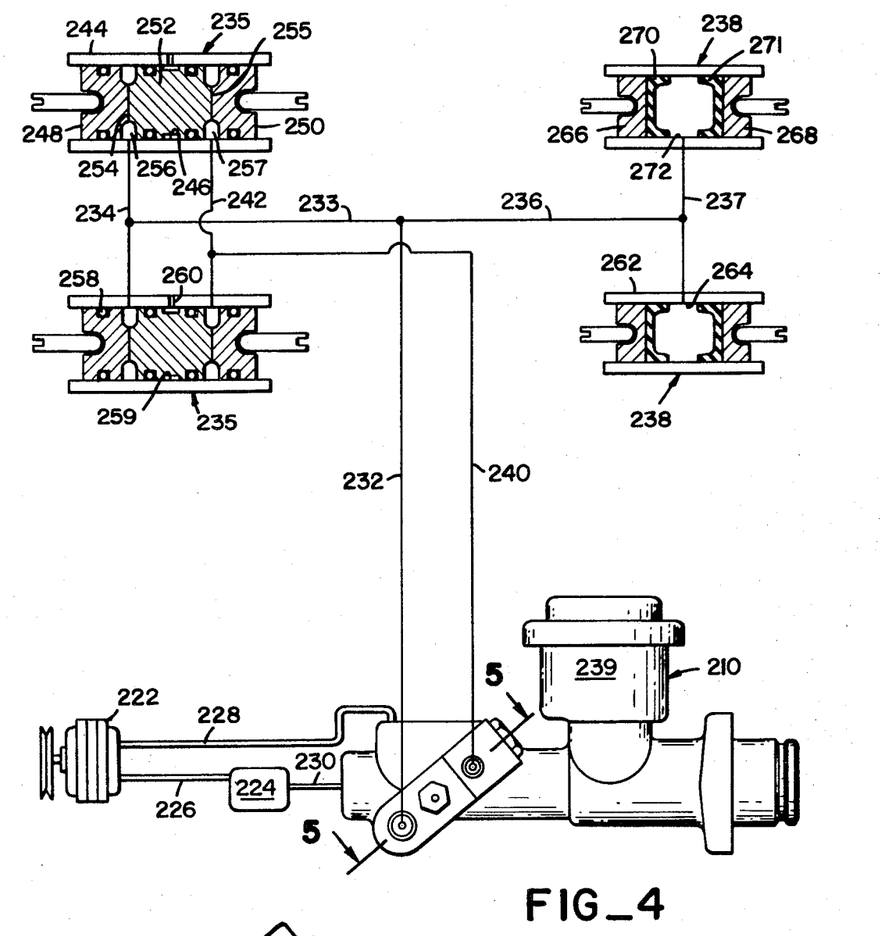
FIG. 4 is a schematic drawing of a dual power and manual brake system illustrating another embodiment of the invention.
Figure 5:
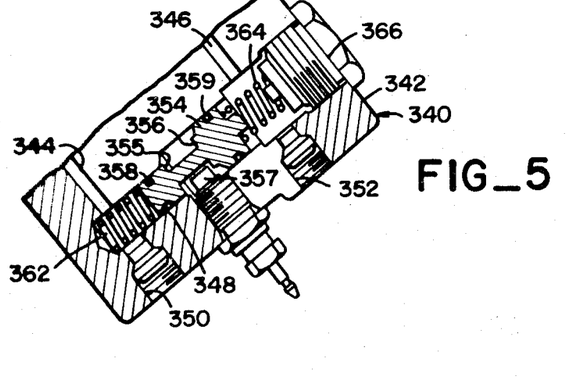
FIG. 5 is an enlarged fragmentary sectional view of the assembly illustrated in FIG. 4, taken on the line 5—5 thereof.
Figure 6:
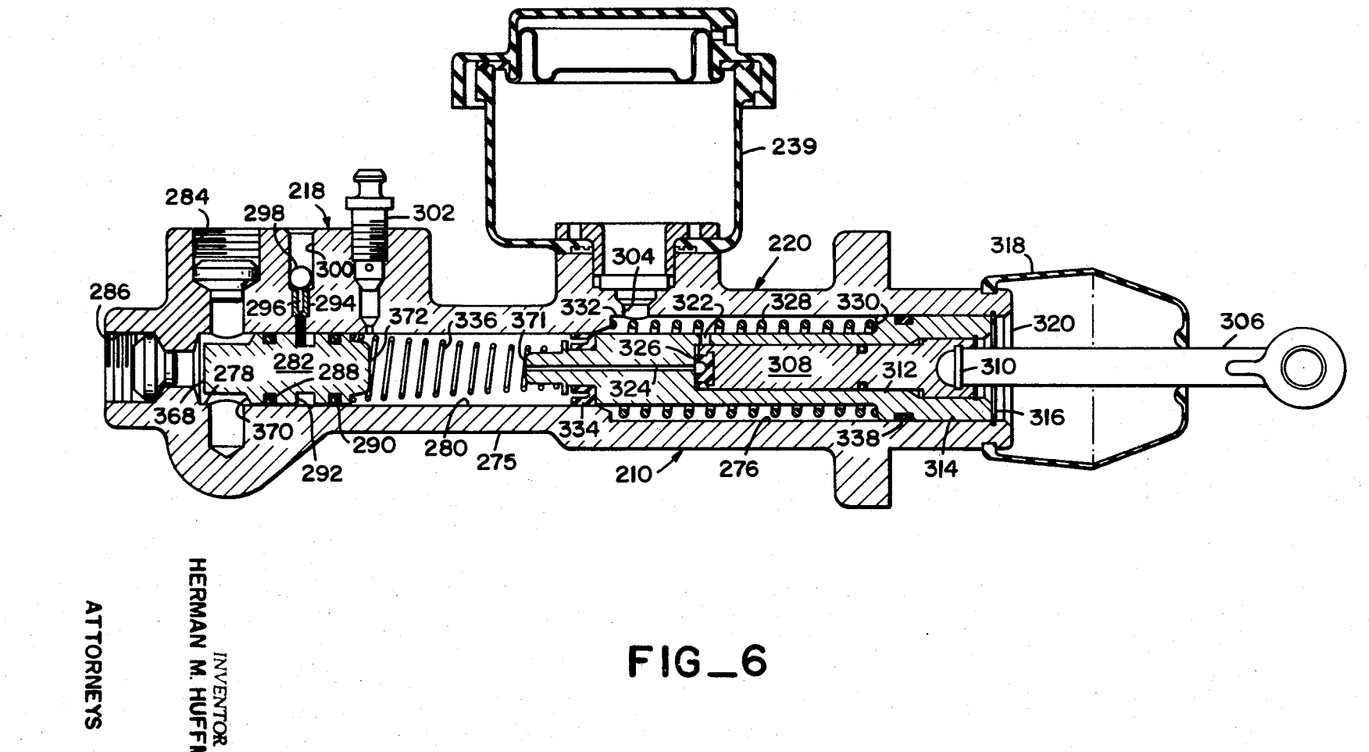
FIG. 6 is an enlarged sectional view of the master cylinder assembly illustrated in FIG. 4.

Another embodiment of the invention is illustrated in FIGS. 4, 5 and 6. In this embodiment of the invention the dual power and manual brake system includes a master cylinder assembly generally designated 210 which may be mounted on the firewall of a motor vehicle so as to be in a position to be actuated by a conventional brake pedal that may, for example, be pivotally mounted on the firewall of the vehicle. The master cylinder 210 has a power or primary fluid pressure generating portion, generally designated 218, and a manual or secondary fluid pressure generating portion, generally designated 220, disposed in axially aligned relationship with respect to the power generating portion 218.

The power brake system includes a suitable source of hydraulic fluid, such as a gear pump 222, arranged to receive hydraulic fluid from a reservoir 224 via a conduit 226 and to discharge the fluid under pressure to the power portion 218 via a conduit 228. When the pump 222 is operating and the power portion 218 is in its non-brake applying position shown in FIG. 6, the fluid flowing through the conduit 228 will pass through the power portion 218 and will return to the reservoir 224 via a conduit 230. When the brake pedal is depressed to actuate the power portion 218 the fluid will be pressurized and diverted in the power portion 218 to a conduit 232 which is connected through lines 233 and 234 with the front wheel cylinders 235 of the vehicle and through lines 236 and 237 with the rear wheel cylinders 238 of the vehicle. The wheel cylinders 235 and 238 are located in a suitable position on the vehicle for actuating elements of a wheel brake, such as brake shoes or the like, not shown.

The manual brake system includes a hydraulic fluid reservoir 239 which is arranged to provide fluid to the pressure generating chamber which will be described hereinafter in greater detail within the secondary fluid generating portion 220 from which the fluid communicates with the front wheel cylinders 235 via a conduit 240 connected to a line 242.

In this embodiment of the invention each front wheel cylinder 235 includes a housing 244 having a bore 246 therein containing laterally expansible first and second pistons 248 and 250. The pistons 248 and 250 are adapted to be connected in a conventional manner to brake elements such as brake shoes (not shown) for applying the front brakes of a vehicle. Between the pistons 248 and 250 there is positioned a sliding piston 252 which has one end portion 254 normally seated against the piston 248 while the other end portion 255 is normally seated against the piston 250. An annular pressure chamber 256 is defined by the adjacent end portions of the pistons 248 and 252, the chamber 256 being in communication with the line 234. An annular chamber 257 is defined by the adjacent end portions of the pistons 250 and 252, the chamber 257 being in communication with the line 242.

In order to avoid loss of fluid from the chambers 256 and 257, conventional annular seals 258 are provided on the periphery of the pistons 248, 250, and 252. The piston 252 also defines a chamber 259 intermediate the seals 258 carried thereby, the chamber 259 communicating with the ambient atmosphere through a port 260 in the housing 244. With such a construction, if there is a failure of either of the seals 258 carried by the piston 252, fluid will emanate from the port 260 to apprise an automobile mechanic of such a seal failure. Fluid emanating from the ends of the housing will indicate a failure of the seals 258 carried by the pistons 248 and 250.

In this embodiment of the invention each rear wheel cylinder 258 includes a housing 262 having a bore 264 therein containing laterally expansible pistons 266 and 268 carrying confronting conventional seals 270 and 271 defining a pressure chamber 272 therebetween connected to the line 237. The pistons 266 and 268 are adapted to be connected to the rear wheel brake actuating elements, such as the brake shoes (not shown) in a conventional manner for applying the rear brakes of the vehicle.

By virtue of this arrangement, when pressurized fluid is introduced into the chamber 256 from the power portion 218 the pressure created in the chamber 256 will urge the piston 248 to the left and the pistons 252 and 250 to the right, as viewed in FIG. 4, whereby the pistons 248 and 250 will act to operate the front brake elements. The normal pressure in the power portion 218 is substantially greater than the pressure in the manual portion 220. For example, the pressure in the power portion 218 may be two and one half times as great as the pressure in the manual portion 220 and the pressure from the power portion will overcome the pressure of the manually actuated fluid pressure generating portion 220 to force the pistons 248 and 250 in opposite directions. At the same time, the pressurized fluid introduced into the chamber 272 of the rear wheel cylinders will urge the pistons 266 and 268 outwardly in opposite directions so that the pistons 266 and 268 operate the rear brake elements.

Thus, as shown in FIG. 4, the power portion 218 is effective to operate the front wheel cylinders as well as the rear wheel cylinders whereas the manual portion 220 is only effective to operate the front wheel cylinders in the event of failure of the power portion 218.

In the normal operation of the master cylinder 210, actuation of the vehicle brake pedal will have the effect of operating both the power portion 218 and the manual portion 220. However, if a loss of pressure should occur in the power portion 218, the movement of the brake pedal will have the effect of introducing pressured fluid into the chamber 257 via the lines 240 and 242. Thus if there is a loss of pressure in the line 232, the piston 252 will remain seated on the piston 248 and the fluid pressure generated in the chamber 257 from the manual portion 220 of the master cylinder 210 will act to urge the pistons 248 and 252 to the left and to urge the piston 250 to the right, as viewed in FIG. 4, whereby the front wheel cylinders 235 will function to operate the front wheel brakes to stop the vehicle.

Referring now in detail to FIG. 6, the master cylinder 210 is comprised of a body 275 which defines a stepped bore 276 that extends throughout the length of the body 275. The bore 276 includes a power chamber portion 278 and a manual chamber portion 280 which is separated from the power chamber portion by a power piston 282. The body 275 defines an inlet port 284 adapted to be connected to the line 228 and an outlet port 286 adapted to be connected to the line 230.

Suitable seals such as 288 and 290 are provided on the power piston to seal the power chamber from the manual chamber. The central portion of the piston 282 defines an annular recess 292 adapted to receive a piston stop 294. In order to provide an indicator which will apprise the user of a failure of one of the seals 288 or 290, a vent 296 is provided in the piston stop 294, a checkball 298 being provided which is disposed in a recess 300 defined by the body 275. With such a construction upon failure of one of the seals 288 or 290 hydraulic brake fluid will leak through the vent 296 and out of the master cylinder thereby indicating a failure of such seals. A conventional bleed screw 302 is also provided in the body portion so that air may be purged from the system.

The bore 276 communicates with the brake fluid reservoir 239 through a port 304, the reservoir 239 serving to replenish the brake fluid in the bore 276 so that the bore is filled with brake fluid at all times.

A push rod 306 is provided the outer end portion of which is adapted to be connected to the brake pedal in a conventional manner while the inner end portion of the push rod is connected to a manual valve 308 by a retainer 310. The manual valve 308 is disposed in the bore 312 of a primary piston 314 the outer end portion of which is retained by a snap ring 316. A boot 318 is provided which serves to prevent dust, dirt and other foreign material from entering the end 320 of the bore 276.

The piston 314 is provided with a radially extending port 322 which communicates with the bore 276 and with an axially extending passageway 324 which communicates with the manual chamber 280. In the embodiment of the invention illustrated the valve 308 carries a seal 326 on the inner end portion thereof which is adapted to close the axially extending passageway 324 after a relatively short valve stroke. By way of example, the valve stroke may be .025 inches.

The primary piston 314 is biased toward the righthand end of the body 276, as viewed in FIG. 6, by a spring 328 one end of which bears against a shoulder 330 provided on the primary piston while the opposite end of the spring 328 bears against a shoulder 332 provided on the body 275 at a position forward of the port 304.

The inner end portion of the primary piston 314 carries a pumping seal 334 which serves to maintain pressure in the manual chamber 280 when the primary piston is advanced. A return spring 336 is provided in the manual chamber 280, one end portion of the spring 336 bearing against the primary piston 314 while the opposite end of the spring 336 bears against the power piston 282. A seal 338 is also provided to seal the periphery of the primary piston in the bore 280.

As shown in FIG. 5 a failure indicator switch 340 is provided which functions to warn the operator of a failure in either the power portion or the manual portion of the dual brake system. The failure indicator switch is comprised of a body portion 342 formed integrally with the body portion 275 of the master cylinder. The body portion 342 defines inlet passageways 344 and 346 which communicate with the power chamber 278 and the manual chamber 280, respectively, and with a longitudinally extending bore 348 provided in the body portion 342. The body portion 342 is also provided with an outlet port 350 adapted to be connected to the line 232 and with an outlet port 352 adapted to be connected to the line 240. A piston 354 is mounted for sliding movement in the bore 348, the cross sectional area of the left end of the piston, as viewed in FIG. 5, being substantially two and one half times less than the cross sectional area of the right end of the piston so that the piston remains centered if the pressure in the power chamber 278 is two and one half times the pressure in the manual chamber 280. The intermediate portion of the piston 354 is reduced in diameter so as to form shoulders 355 and 356 which are adapted to engage an electrical contact 357 when the piston 354 is off center. Suitable seals 358 and 359 are also provided on the opposite end portions of the piston 354. Centering springs 362 and 364 are provided which function to maintain the piston in a centered relationship with respect to the contact 357 unless an unbalanced pressure condition arises due to a hydraulic failure in either the power system or the manual system. An end cap 366 is provided which threadably engages the body portion 342 so as to close the bore 348 after the indicator switch has been assembled.

In operation when there is a failure of either the manual system or the power system of the dual brake system, the unequal pressures acting on the piston 354 will force the piston against the contact 357 thereby completing an electrical circuit (not shown) to energize a warning light and apprising the operator of the vehicle of a failure in the dual brake system.

In the operation of the master cylinder 210, when the vehicle brake pedal is depressed the force applied by the operator of the vehicle is transmitted through the push rod 306 so as to advance the manual valve 308 to seal the axially extending passageway 324 to pressurize the manual chamber 280. The increased pressure in the manual chamber 280 then forces the piston 282 to the left, as viewed in FIG. 6, so that the end 368 of the piston 282 closes the outlet port 286 with the result that the pressure created by the pump 222 builds up in the pressure chamber 278 and such pressure is transmitted to the front wheel cylinders 235 and the rear wheel cylinders 238 through the lines 232, 233, 234, 236 and 237. The cross sectional area of the annular portion 370 of the power piston 282 determines the reaction and the pedal effort required to actuate the master cylinder and is smaller in cross section than the cross sectional area of the manual chamber 280. It is preferred that the ratio be about two and one half to one so that the power pressure is two and one half times greater than the manual pressure.

In the event there is a hydraulic failure in the manual system the end 371 of the primary piston 314 will engage the end 372 of the piston 282 so as to force the piston 282 to the left as previously described to close the outer port 286. Thus, it will be recognized that a failure in the manual system will not impair the operation of the power system of the dual brake system. From the foregoing description, it will also be appreciated that in this embodiment of the invention a dual power and manual brake system is provided whereby each system is independently operable of the other and failure of one system will not impair the operation of the other system. While preferred embodiments of the invention have been illustrated and described it will be understood that various changes and modifications may be made without departing from the spirit of the invention.

What is claimed is:

1. A hydraulic brake system comprising, in combination, a fluid pressure operated mechanism responsive to hydraulic fluid under pressure for actuating a wheel brake element, means defining a primary chamber and a secondary chamber, said primary and secondary chambers being independently in separate hydraulic communication with said mechanism for independently applying hydraulic pressure thereto, means for concurrently applying different hydraulic pressures from both of said chambers to said mechanism, the pressure applied by said primary chamber being greater than the pressure applied by said secondary chamber, said mechanism including first and second laterally displaceable thrust pistons and a floating center piston therebetween arranged to define first and second pressure chambers respectively between the center piston and each of said first and second pistons, said primary and secondary chambers communicating respectively with said first and second pressure chambers so that in the event of loss of hydraulic pressure from one of said primary and secondary chambers, the hydraulic pressure from the other of said chambers can be applied to said mechanism to effect displacement of said first and second pistons, said floating piston abutting against said first piston, a compression spring spacing said second piston from said floating piston so that application of hydraulic pressure from said primary chamber to said first pressure chamber will displace said floating piston toward said second piston to create a pressure to said secondary chamber, thereby restricting actuation thereof.

2. A hydraulic brake system comprising, in combination, a fluid pressure operated mechanism operable from either of two separate hydraulic pressure sources to actuate a wheel brake element, a primary cylinder means, a secondary cylinder means, said primary and secondary cylinder means being in separate hydraulic circuits in communication with said mechanism for independently applying different hydraulic pressures to said mechanism, the pressure applied by said primary cylinder means being greater than the pressure applied by said secondary cylinder means, a pair of push rods operatively associated with said cylinder means for actuating the same, a linkage pivotally connected to each push rod, and a brake pedal connected to said linkage for exerting pressure on said push rods to actuate both cylinder means, said mechanism being responsive to pressure in the circuit associated with said primary cylinder means to exert a pressure in the circuit associated with said secondary cylinder means so that when pressure is applied to said brake pedal movement of the push rod associated with the secondary cylinder means is opposed, thereby enabling said primary cylinder means to be the primary actuator of the brake system.

3. The combination set forth in claim 2, wherein limit means are provided in each of said cylinder means for limiting the extent of movement of the associated push rod so that upon loss of hydraulic pressure in one of said circuits, the push rod associated with said one circuit will seat when pressure is applied to said brake pedal and said linkage will pivot relative to the seated push rod for effecting movement of the other push rod.

4. The combination set forth in claim 3, wherein said limit means are located so that the stroke of the push rod associated with the primary cylinder means is relatively short, whereby if a power failure occurs in the circuit associated with said primary cylinder the brake pedal can be operated from essentially its normal position by pivotal movement of said linkage relative to the push rod associated with said primary cylinder.

* * * * *